United States Patent
Ogawa

(10) Patent No.: US 11,789,348 B2
(45) Date of Patent: Oct. 17, 2023

(54) PHOSPHOR MEMBER, LIGHT SOURCE APPARATUS, AND PROJECTOR

(71) Applicant: CASIO COMPUTER CO., LTD., Tokyo (JP)

(72) Inventor: Masahiro Ogawa, Ome (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 17/463,364

(22) Filed: Aug. 31, 2021

(65) Prior Publication Data

US 2022/0075246 A1 Mar. 10, 2022

(30) Foreign Application Priority Data

Sep. 9, 2020 (JP) .................................. 2020-151528

(51) Int. Cl.
*G03B 21/20* (2006.01)
*G02B 26/00* (2006.01)

(52) U.S. Cl.
CPC ......... *G03B 21/204* (2013.01); *G02B 26/008* (2013.01); *G03B 21/2066* (2013.01)

(58) Field of Classification Search
CPC . G03B 21/204; G03B 21/2066; G02B 26/008
See application file for complete search history.

(56) References Cited

U.S. PATENT DOCUMENTS

| | | | | |
|---|---|---|---|---|
| 11,275,297 B2 * | 3/2022 | Sugiyama | .......... | G03B 21/2073 |
| 2009/0034106 A1 * | 2/2009 | Ho | ....................... | G02B 26/008 |
| | | | | 359/891 |
| 2013/0258639 A1 * | 10/2013 | Hu | ...................... | G03B 21/2066 |
| | | | | 362/84 |
| 2015/0098070 A1 * | 4/2015 | Hsieh | ................... | G03B 21/204 |
| | | | | 359/326 |
| 2016/0252722 A1 * | 9/2016 | Li | ...................... | G03B 21/2066 |
| | | | | 362/84 |
| 2016/0274353 A1 * | 9/2016 | Ando | .................... | C03C 17/007 |
| 2018/0314140 A1 * | 11/2018 | Liao | ...................... | G03B 21/204 |
| 2020/0064720 A1 * | 2/2020 | Umamine | ........... | G02B 27/141 |
| 2020/0208048 A1 * | 7/2020 | Zhang | .................... | C09K 11/02 |
| 2021/0149288 A1 * | 5/2021 | Mochizuki | .......... | G02B 27/141 |

FOREIGN PATENT DOCUMENTS

| | | |
|---|---|---|
| JP | 2014-029773 A | 2/2014 |
| JP | 2016-161709 A | 9/2016 |
| JP | 2018-189951 A | 11/2018 |
| WO | 2015/072319 A1 | 5/2015 |

OTHER PUBLICATIONS

JPO; Application No. 2020-151528; Notice of Reasons for Refusal dated Apr. 21, 2022.
JPO; Application No. 2020-151528; Notice of Reasons for Refusal dated Sep. 29, 2022.

* cited by examiner

*Primary Examiner* — Magda Cruz
(74) *Attorney, Agent, or Firm* — Fitch, Even, Tabin & Flannery LLP

(57) ABSTRACT

A phosphor member has a phosphor body configured to absorb excitation light to thereby emit first fluorescent light including a first wavelength component and a second wavelength component having a wavelength shorter than a wavelength of the first wavelength component, and a filter configured to transmit the first wavelength component as light source light and reflect the second wavelength component towards the phosphor body as second excitation light.

8 Claims, 8 Drawing Sheets

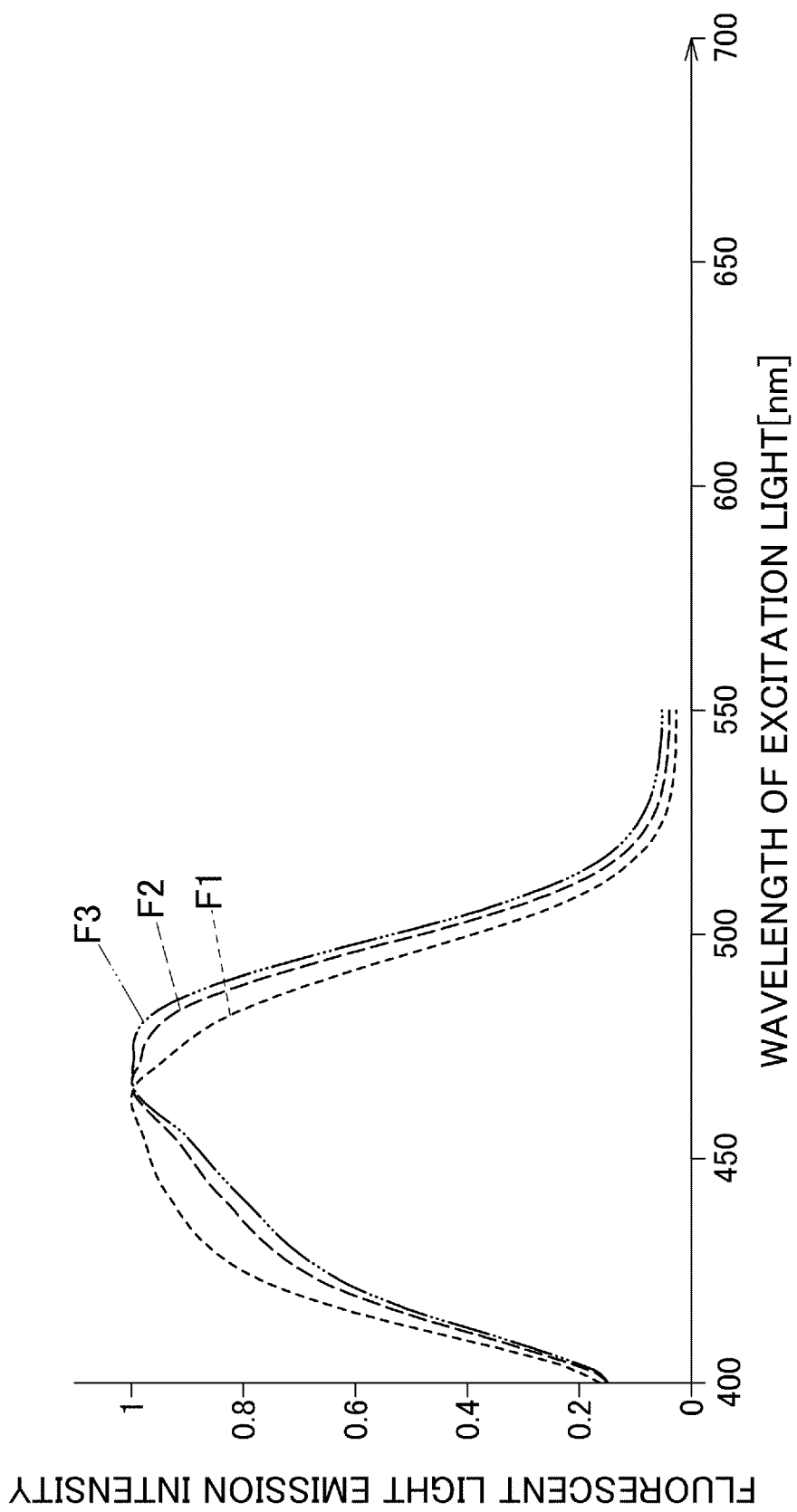

PHOSPHOR MEMBER, LIGHT SOURCE APPARATUS, AND PROJECTOR

CROSS-REFERENCE TO RELATED APPLICATION

This patent application is based upon the benefit of priority under 35 USC 119 from Japanese Patent Application No. 2020-151528 filed on Sep. 9, 2020, the entire disclosure of which, including the specification, claims, drawings and abstract, is incorporated herein by reference.

BACKGROUND OF THE INVENTION

Field of the Invention

The present invention relates to a phosphor member, a light source apparatus, and a projector.

Description of the Related Art

There have currently been proposed projecting systems (projectors) for projecting, for example, an image of a display screen of a personal computer, a video image, an image resulting from image data stored in a memory card or the like, and the like on to a screen.

For example, Japanese Patent Laid-Open No. 2020-155986 (JP-A-2020-155986) discloses a projector including an excitation light source and a phosphor wheel configured to be driven rotationally. The excitation light source emits excitation light, which is light having a wavelength in the blue wavelength range or simply light in the blue wavelength range. In a case that a red phosphor body is situated in a shining position of fluorescent light on the phosphor wheel, light having a wavelength in the red wavelength range or simply light in the red wavelength rage is excited, while in a case that a green phosphor body is situated in the shining position, light having a wavelength in the green wavelength range or simply light in the green wavelength range is excited.

When the red phosphor body or the green phosphor body is excited by excitation light, there may be a case in which a part of the excitation light is reflected by a base of the phosphor wheel or the like without exciting the phosphor body and is then discarded as discard light. In addition, there may be a case in which a wavelength of fluorescent light emitted from the phosphor body contains an unnecessary wavelength component for formation of a color, and in this case, too, a partial wavelength component is removed along an optical path to a light guiding device as discard light.

SUMMARY OF THE INVENTION

According to an aspect of the present invention, there is provided a phosphor member having:

a phosphor body configured to absorb excitation light to thereby emit first fluorescent light including a first wavelength component and a second wavelength component having a wavelength shorter than a wavelength of the first wavelength component; and a filter configured to transmit the first wavelength component as light source light and reflect the second wavelength component towards the phosphor body as second excitation light.

According to another aspect of the present invention, there is provided a light source apparatus including:

a phosphor member having a phosphor body configured to absorb excitation light to thereby emit first fluorescent light including a first wavelength component and a second wavelength component having a wavelength shorter than a wavelength of the first wavelength component, and a filter configured to transmit the first wavelength component as light source light and reflect the second wavelength component towards the phosphor body as second excitation light; and an excitation light source configured to emit blue light as the excitation light, wherein the filter transmits red light which is the first wavelength component.

According to a further aspect of the present invention, there is provided a projector including:

a light source apparatus including a phosphor member having a phosphor body configured to absorb excitation light to thereby emit first fluorescent light including a first wavelength component and a second wavelength component having a wavelength shorter than a wavelength of the first wavelength component, a filter configured to transmit the first wavelength component as light source light and reflect the second wavelength component towards the phosphor body as second excitation light, and an excitation light source configured to emit blue light as the excitation light, wherein the filter transmits red light which is the first wavelength component;

a display device configured to form image light when light source light from the light source apparatus is shined on thereto;

a projection optical system configured to project the image light formed by the display device on to a projection target member; and a processor configured to control the display device and the light source apparatus.

BRIEF DESCRIPTION OF THE DRAWINGS

FIG. 5 is a diagram showing excitation spectra for fluorescent wavelengths of 580 nm, 620 nm, and 640 nm of a red phosphor body according to the embodiment of the present invention;

DESCRIPTION OF THE EMBODIMENT

Figure 1:
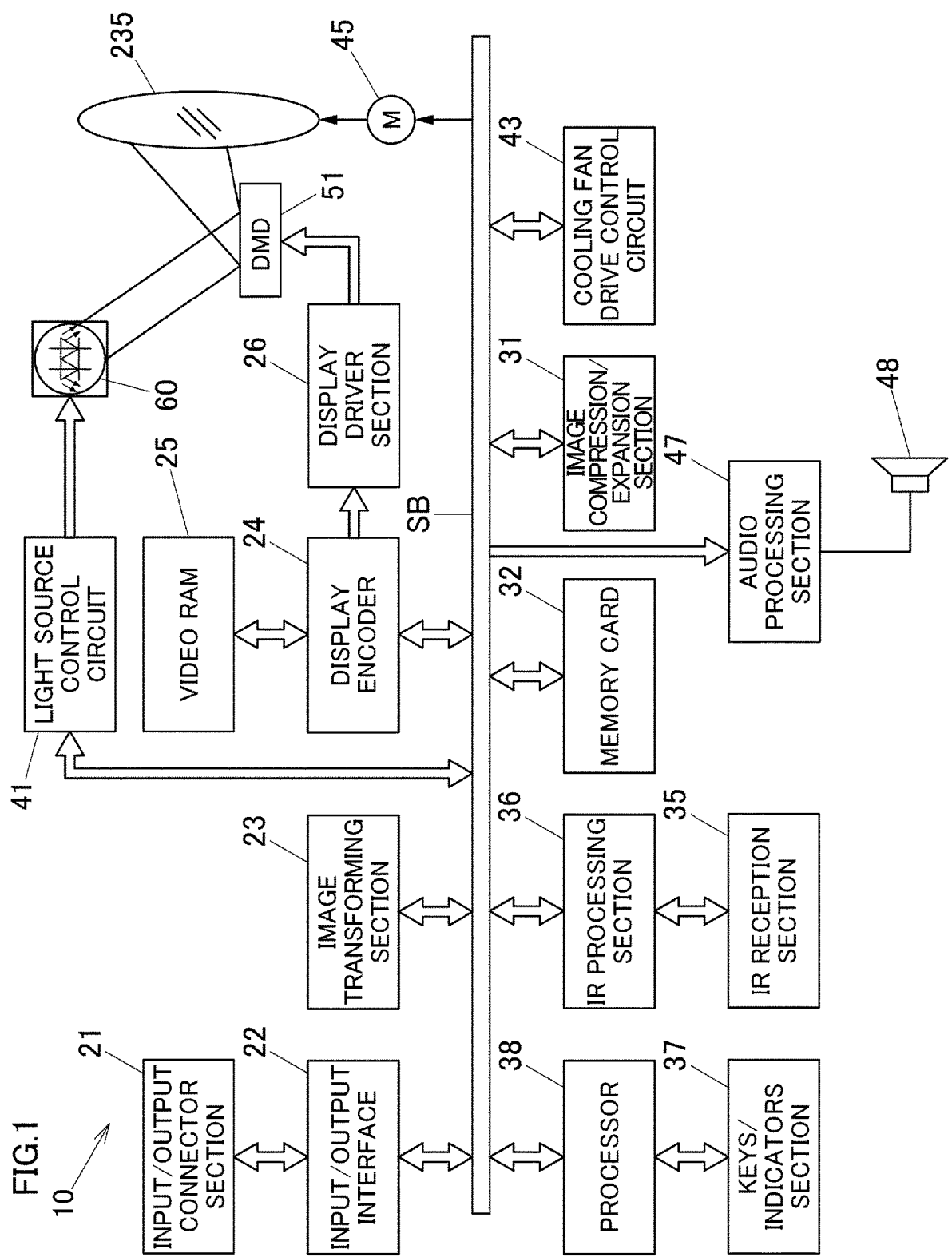
FIG. 1 is a block diagram showing functional circuitries of a projector according to an embodiment of the present invention.

Hereinafter, an embodiment of the present invention will be described. FIG. 1 is a block diagram showing functional circuitries of a projector control unit (a control unit) of a projector 10. The projector control unit (the control unit) is made up of a central processing unit (CPU) including an image transforming section 23 and a control section 38, a front-end unit including an input/output interface 22, and a formatter unit including a display encoder 24 and a display drive section 26.

This control section 38 governs the control of operations of individual circuitries inside the projector 10 and is configured of CPU, a read only memory (ROM) for fixedly storing operation programs such as various settings or the like, RAM used as a work memory, and the like.

Then, image signals of various standards which are input from an input/output connector section 21 are sent to the image transforming section 23 via the input/output interface 22 and a system bus SB, and the image signals so sent are then transformed so as to be unified into an image signal of a predetermined format which is suitable for display in the image transforming section 23. Thereafter, the unified image signal of the predetermined format is output to the display encoder 24.

Additionally, the display encoder 24 deploys the image signal input thereinto on a video RAM 25 for storage therein and then generates a video signal from the stored contents of the video RAM 25, outputting the video signal so generated to the display drive section 26.

The display drive section 26 functions as a display device controlling means. The display drive section 26 drives a display device 51, which is a spatial optical modulator (SOM), at an appropriate frame rate in response to the image signal output from the display encoder 24. In the present embodiment, a digital micromirror device (DMD) is used for the display device 51. Pencils of light emitted from a light source apparatus 60 are shined onto the display device 51 via a light source-side optical system 170, which will be described later, whereby an optical image is formed by the reflected lights reflected by the display device 51. The optical image so formed is then emitted via a projection optical system 220 and is projected on to a projection target member such as a screen, not shown, for display on the screen. A movable lens group 235 of the projection optical system 220 can be driven manually or automatically using a lens motor 45 for zooming and focusing.

An image compression/expansion section 31 performs a recording process in which a luminance signal and a color difference signal of the image signal are data compressed through processing such as Adaptive Discrete Cosine Transform (ADCT), Huffman coding and the like, and the compressed data is sequentially written on a memory card 32, which is a detachable recording medium.

Further, with the projector 10 set in a reproducing mode, the image compression/expansion section 31 can read out the image data recorded in the memory card 32 and expands the individual image data that makes up a series of dynamic images frame by frame. Then, the image compression/expansion section 31 executes a process in which the image compression/expansion section 31 outputs the image data to the display encoder 24 by way of the image transforming section 23 so as to enable the display of dynamic images or the like based on the image data stored in the memory card 32.

A keys/indicators section 37 is configured of main keys, indicators, and the like which are provided on a housing of the projector 10, and operation signals of the keys/indicators section 37 are sent out directly to the control section 38. Key operation signals from a remote controller are received by an IR reception section 35 and are then demodulated into a code signal in an Ir processing section 36 to be output to the control section 38.

An audio processing section 47 is connected with the control section 38 by way of the system bus SB. The audio processing section 47 includes a circuitry for a sound source such as a PCM sound source or the like. With the projector 10 set in a projection mode and the reproducing mode, the audio processing section 47 converts audio data into analog signals and drives a speaker 48 so as to output sound or voice loudly.

In addition, the control section 38 controls a light source control circuit 41. The light source control circuit 41 causes an excitation light shining device 70 (an excitation light source) to emit light separately at predetermined timings so that lights in predetermined wavelength ranges required in generating an image are emitted from the light source apparatus 60, whereby lights in the red, green and blue wavelength ranges are emitted.

Further, the control section 38 causes a cooling fan drive control circuit 43 to detect temperatures using multiple temperature sensors which are provided in the light source apparatus 60 and the like so as to control revolution speeds of cooling fans based on the results of the temperature detections. In addition, the control section 38 also causes the cooling fan drive control circuit 43 to keep the cooling fans revolving by use of a timer or the like even after a power supply to a main body of the projector 10 is switched off. Alternatively, the control section 38 causes the cooling fan drive control circuit 43 to switch off the power supply to the main body of the projector 10 depending upon the results of the temperature detections by the temperature sensors.

Next, referring to FIG. 2, an internal structure of the projector 10 will be described. In describing the projector 10 as below, a left-hand side thereof with respect to a projecting direction is referred to as left, while an opposite side thereto is referred to as right. In addition, when front and rear are referred to in relation to the projector 10, a side of the projector 10 that faces a traveling direction of projection light is referred to as front, while an opposite side thereto is referred to as rear.

The projector 10 includes a control circuit board 241 disposed in the vicinity of a right panel 14. This control circuit board 241 includes a power supply circuit block, a light source control block, and the like. Additionally, the projector 10 includes the light source apparatus 60, which is disposed to a side of the control circuit board 241, that is, substantially at a central portion of the housing of the projector 10. Further, the projector 10 includes the light source-side optical system 170 and the projection optical system 220, which are disposed between the light source apparatus 60 and a left panel 15.

The light source apparatus 60 includes the excitation light shining device 70, which constitutes a light source of light having a wavelength in the blue wavelength range or simply light in the blue wavelength range and excitation light and a red and green light source device 80, which constitutes a light source of light having a wavelength in the red wavelength range or simply light in the red wavelength range and light having a wavelength in the green wavelength range or simply light in the green wavelength range. The red and green light source device 80 is made up of the excitation light shining device 70 and a phosphor plate device 100. In addition, a light guiding optical system 140 is disposed in the light source apparatus 60. The light guiding optical system 140 is configured to guide light in the blue wavelength range, light in the green wavelength range, and light in the red wavelength range, which are emitted from the excitation light shining device 70 and the red and green light source device 80, to an entrance port of a light guiding device 175. In the present embodiment, the light guiding device 175 is a light tunnel where the intensity of light incident thereon is made uniform. A glass rod, a micromirror array, or the like can also be used for the light guiding device 175.

The excitation light shining device 70 is disposed substantially at a central portion in a left-right direction of the projector 10 and in the vicinity of a back panel 13. The excitation light shining device 70 includes multiple blue laser diodes 71, a reflection mirror group 75, collective lenses 77, 79, a diffuse plate 78, a heat sink 81, and the like. The multiple blue laser diodes 71, which are semiconductor light emitting elements, are disposed in such a manner that their optical axes are substantially parallel to the back panel 13 and constitute a light source group. The reflection mirror group 75 changes the directions of axes of lights emitted individually from the blue laser diodes 71 through 90 degrees towards a front panel 12. The collective lenses 77, 79 individually collect lights emitted individually from the blue laser diodes 71. The collective lens 77 is a double-convex lens, and the collective lens 79 is a double-concave lens. The diffuse plate 78 is disposed between the collective lens 77 and the collective lens 79 and transmits excitation light L1 (light in the blue wavelength range) emerging from the collective lens 77 towards the collective lens 79 while diffusing it. Additionally, the heat sink 81 is disposed between the blue laser diodes 71 and a right panel 14.

The multiple blue laser diodes 71 are arranged into a matrix configuration. A collimator lens 73 is disposed on an optical axis of each blue laser diode 71 to convert light emitted from that blue laser diode 71 into parallel light so as to enhance the directivity of the emitted light. The reflection mirror group 75 is such that multiple reflection mirrors are arranged like steps of a staircase and are integrated into a mirror base plate 76. The reflection mirror group 75 is configured so as to be adjusted in position relative to the mirror base plate 76 and emits or directs excitation lights emitted from the blue laser diodes 71 towards the collective lens 77 by reflecting the excitation lights in such a manner as to narrow a sectional area of a pencil of light in one direction.

A cooling fan 261 is disposed between the heat sink 81 and the back panel 13. The blue laser diodes 71 are cooled by this cooling fan 261 and the heat sink 81. Additionally, a cooling fan 261 is also disposed between the reflection mirror group 75 and the back panel 13. The reflection mirror group 75 and the collective lens 77 are cooled by the cooling fan 261 which is disposed at a side of the reflection mirror group 75 which faces the back panel 13.

The phosphor plate device 100, which constitutes the red and green light source device 80, is disposed on an optical path of excitation light emitted from the excitation light shining device 70 and in the vicinity of the front panel 12. The phosphor plate device 100 includes a phosphor wheel 101, a motor 110, a collective lens group 111, and a collective lens 115. The phosphor wheel 101 is disposed in such a manner as to be parallel to the front panel 12, in other words, in such a manner as to be at right angles to an axis of light emitted from the excitation light shining device 70. The motor 110 rotationally drives this phosphor wheel 101. The collective lens group 111 collects a pencil of excitation light emitted from the excitation light shining device 70 to the phosphor wheel 101 and also collects a pencil of light emitted from the phosphor wheel 101 in the direction of the back panel 13. The collective lens 115 collects a pencil of light emitted from the phosphor wheel 101 in the direction of the front panel 12. A cooling fan 261 is disposed between the motor 110 and the front panel 12, and the cooling fan 261 cools the phosphor plate device 100 and the like.

Here, referring to FIGS. 3 and 4A to 4C, the configuration of the phosphor wheel 101 will be described. A transmission area 310, a red phosphor area 320, and a green phosphor area 330 are provided contiguously end to end in a circumferential direction on the phosphor wheel 101. Since the phosphor wheel 101 rotates about a rotational shaft 112 of the motor 110, the position of a shining area S of excitation light L1 changes with time. The red phosphor area 320 and the green phosphor area 330 receive excitation light L1 that is shined from the excitation light shining device 70 on to them by way of the collective lens group 111 to thereby emit light in the red wavelength range and light in the green wavelength range, respectively. The transmission area 310 transmits or diffuse transmits excitation light, which is light emitted from the excitation light shining device 70.

Figure 4A:
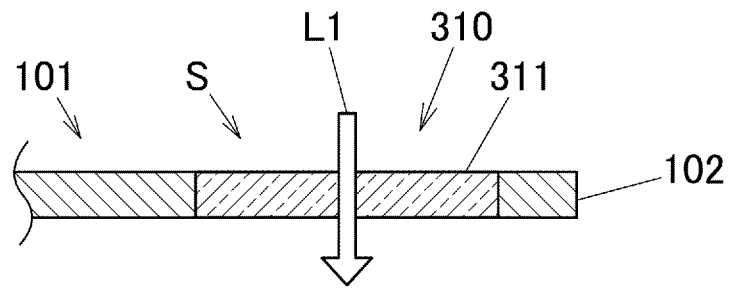
FIG. 4A is a sectional view of a diffuse area taken along a line Iva-Iva in the schematic plan view of the phosphor wheel shown in FIG. 3 according to the embodiment of the present invention.

A base 102 of the phosphor wheel 101 is formed of metal such as copper, aluminum or the like and has a substantially circular disc shape. As shown in FIG. 4A, the transmission area 310 is formed by fitting a transmission member 311 having transmissivity in a cut-out hole portion that is cut in the base 102. The transmission member 311 may be configured to diffuse transmit excitation light L1 by forming fine irregularities on one or both sides thereof through sandblasting.

Figure 4B:
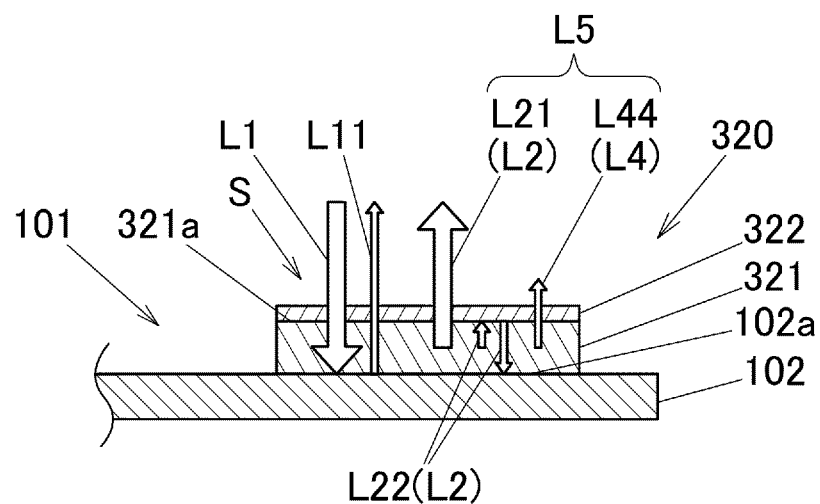
FIG. 4B is a sectional view of a red phosphor area taken along a line IVb-IVb in the schematic plan view of the phosphor wheel shown in FIG. 3 according to the embodiment of the present invention.

In the red phosphor area 320 shown in FIG. 4B, a mirror surface 102a is formed on a side of the red phosphor area 320 that faces the excitation light shining device 70 by mirror finishing the side through silver deposition or the like. A red phosphor body 321 is formed on this mirror surface 102a. Further, a dichroic filter 322 is provided on a surface 321a of the red phosphor body 321. Although this will be described later referring to from FIG. 6A on, the dichroic filter 322 transmits mainly a long wavelength-side red wavelength component in fluorescent light emitted from the red phosphor body 321 and reflects a short wavelength-side green wavelength component in the fluorescent light. Additionally, the dichroic filter 322 transmits excitation light L1 (light in the blue wavelength range) that is emitted from the excitation light shining device 70.

FIG. 5 is a diagram showing excitation spectra F1 to F3 of the red phosphor body 321. The excitation spectra F1 to F3 are the results of measurement of fluorescent light emission intensity using a spectrofluorometer when one of wavelengths of first fluorescent light L2 that is emitted from the red phosphor body 321 is selected as a detection wavelength and the first excitation light L2 is scanned for the detection wavelength by changing the wavelength of excitation light L1 from 400 nm to 550 nm. In FIG. 5, an axis of ordinates denotes fluorescent light emission intensity, and an axis of abscissas denotes the wavelength [nm] of excitation light L1. The excitation spectrum F1 is the result of the measurement when the detection wavelength is 580 nm, and the excitation spectrum F2 is the result of the measurement when the detection wavelength is 620 nm. Additionally, the excitation spectrum F3 is the result of the measurement when the detection wavelength is 640 nm. When the red phosphor body 321 is caused to emit first excitation light L2 having wavelengths ranging from 580 nm to 640 nm therefrom, the red phosphor body 321 can emit efficiently first fluorescent light L2 by using wavelengths ranging from 460 nm to 480 nm as excitation light L1 as shown in FIG. 5. When a maximum value of the fluorescent light emission intensity of the excitation spectrum F1 is referred to as 1 (the wavelength of the excitation light then is about 466.5 nm), the conversion efficiency of excitation light L1 having a wavelength of 455 nm, which is used in the present embodiment, is about 0.93.

Figure 6A:
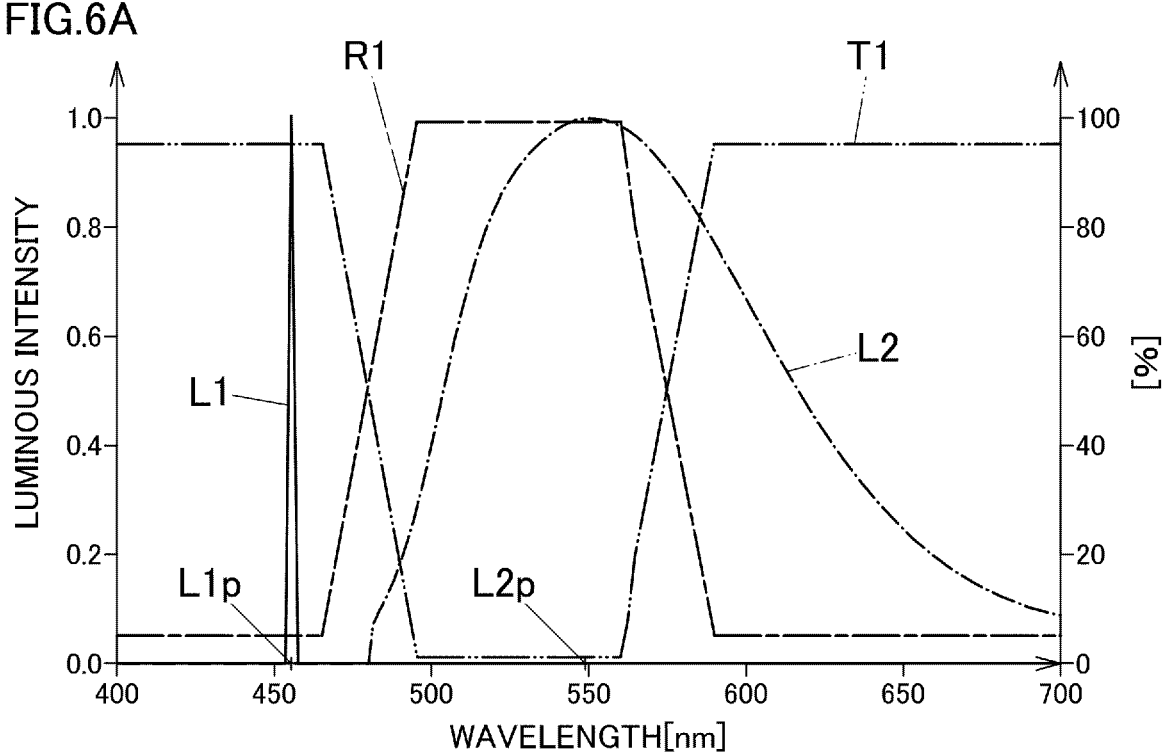
FIG. 6A is a diagram explaining actions of lights in a red phosphor area according to the embodiment of the present invention, which shows a relationship among excitation light, first fluorescent light emitted from the red phosphor body, and characteristics of a dichroic filter.

FIG. 6A shows a transmission characteristic T1 and a reflection characteristic R1 of the dichroic filter 322 in the red phosphor area 320, excitation light L1 emitted from the excitation light shining device 70, and first fluorescent light L2 emitted from the red phosphor body 321. An axis of abscissas denotes wavelength [nm], a left axis of ordinates denotes luminous intensities of excitation light L1 and first fluorescent light L2, and a right axis of ordinates denotes a transmittance [%] of the transmission characteristic T1 or a reflectance [%] of the reflection characteristic R1. The luminous intensities of excitation light L1 and first fluorescent light L2 show individually relative distributions when the maximum value is referred to as 1. In the following description, as its characteristic, the dichroic filter 322 is considered to transmit or reflect light without absorbing the light.

As shown by the transmission characteristic T1 and the reflection characteristic R1 shown in FIG. 6A, the dichroic filter 322 has a transmissivity of the order of 95% (a reflectance factor of the order of 5%) in a wavelength range up to 465 nm on a short wavelength side and in a wavelength range from 590 nm onward on a long wavelength side and has a transmissivity of the order of 1% (a reflectance factor of the order of 99%) in a wavelength range from 495 nm to 560 nm. The transmission characteristic T1 and the reflectance characteristic R1 change substantially linearly in a monotonous fashion in the wavelength range from 465 nm to 495 nm and in the wavelength range from 560 nm to 590 nm. Consequently, the dichroic filter 322 constitutes a magenta filter for transmitting mainly light in the blue wavelength range and light in the red wavelength range and reflecting light in the green wavelength range. The transmission characteristic T1 and the reflection characteristic R1 of the dichroic filter 322 of the present embodiment constitute one example, and hence, a cut-on wavelength, a cut-off wavelength, and the like can be changed as required depending on wavelength distributions of excitation light L1 and first fluorescent light L2.

Excitation light L1 and first fluorescent light L2 are shown with their luminous intensities at peak wavelengths L1p, L2p, which are referred to as 1. The peak wavelength L1p of excitation light L1 is about 455 nm, and excitation light L1 includes mainly wavelength components from 453.5 nm to 456.5 nm. The peak wavelength L2p of first fluorescent light L2 is about 550.5 nm, and first fluorescent light L2 includes mainly wavelength components from 480 nm to 700 nm. Although first fluorescent light L2 includes wavelength components from 700 nm onward, those wavelength components are omitted from both description and illustration.

As shown in FIG. 4B, excitation light L1 shined on to the red phosphor area 320 enters the dichroic filter 322. Since excitation light L1 is distributed over a wavelength range of a high transmissivity of the order of 95% in the transmission characteristic T1 of the dichroic filter 322 (refer to FIG. 6A), the excitation light L1 that has entered the dichroic filter 322 is transmitted through the dichroic filter 322 to enter the red phosphor body 321. Then, the red phosphor body 321 is excited by the excitation light L1 to thereby emit first fluorescent light L2. Thus, first fluorescent light L2 is emitted in every direction from each area within the red phosphor body 321, whereafter a part of the first fluorescent light L2 is emitted directly towards the dichroic filter 322, while another part of the first fluorescent light L2 is reflected on the mirror surface 102a of the base 102 and is then emitted towards the dichroic filter 322.

Figure 2:
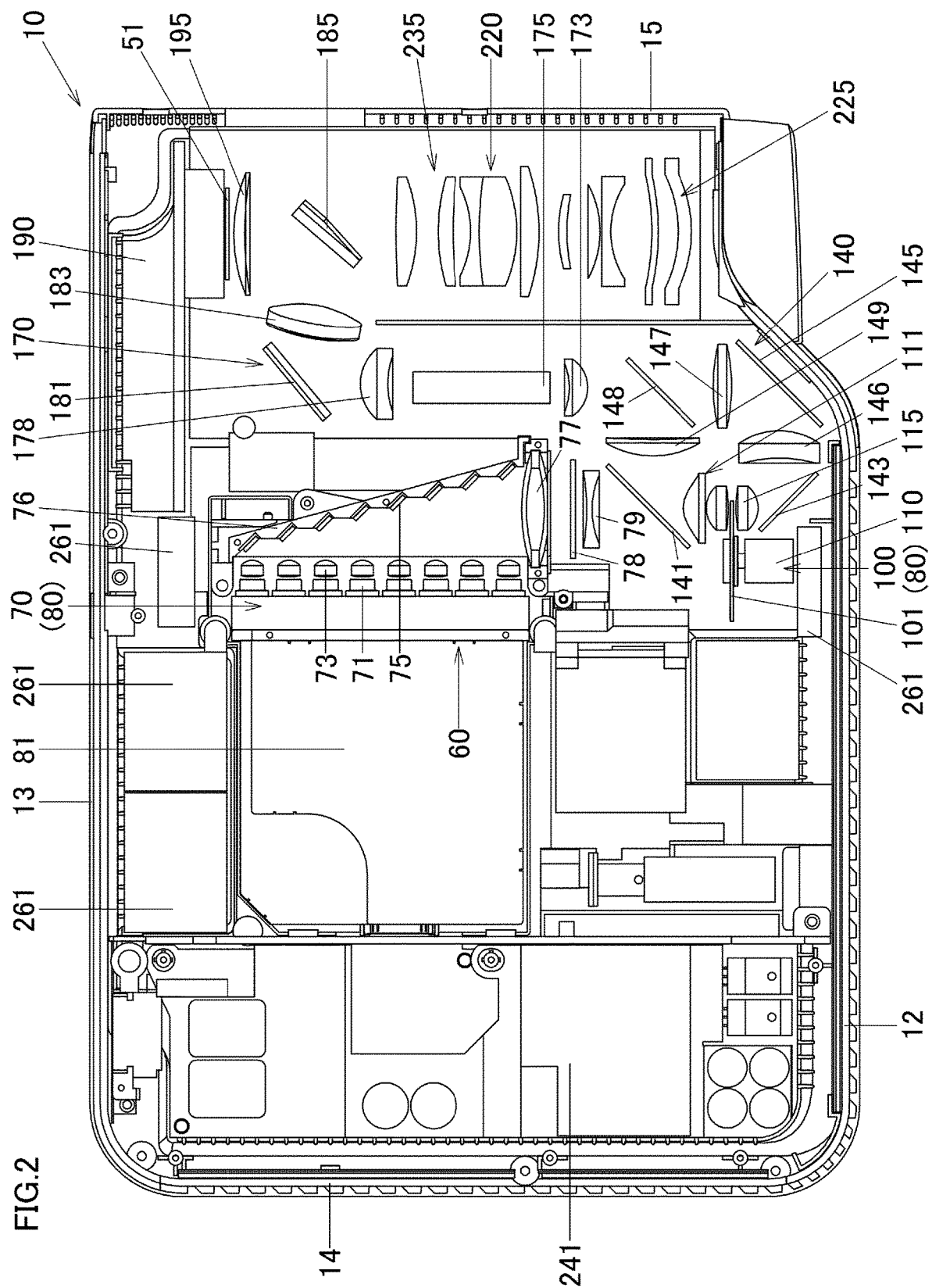
FIG. 2 is a schematic plan view showing an internal structure of the projector according to the embodiment of the present invention.
Figure 3:
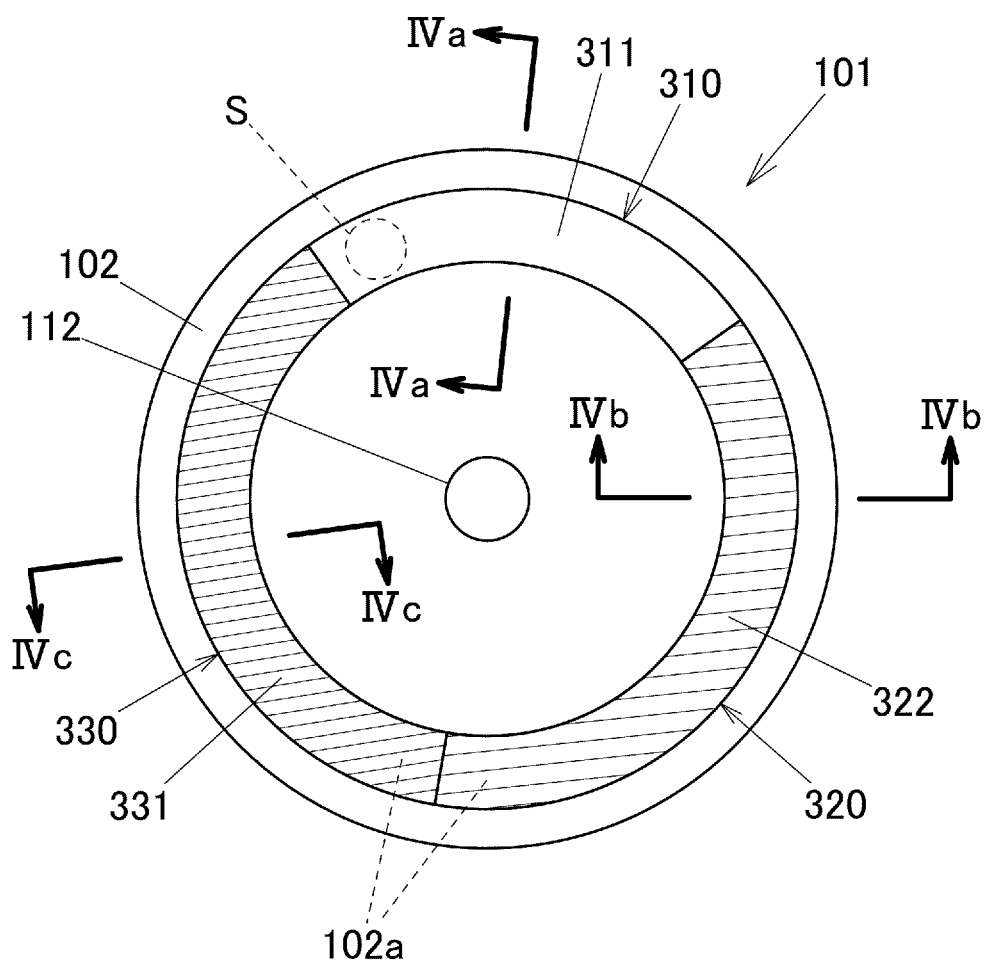
FIG. 3 is a schematic plan view of a phosphor wheel according to the embodiment of the present invention.

A part of the excitation light L1 is reflected on the mirror surface 102a of the base 102 without exciting the red phosphor body 321, whereafter a part of the reflected excitation light is further transmitted through the dichroic filter 322 to be emitted towards the collective lens group 111 shown in FIG. 2 as reflected light L11.

Figure 6B:
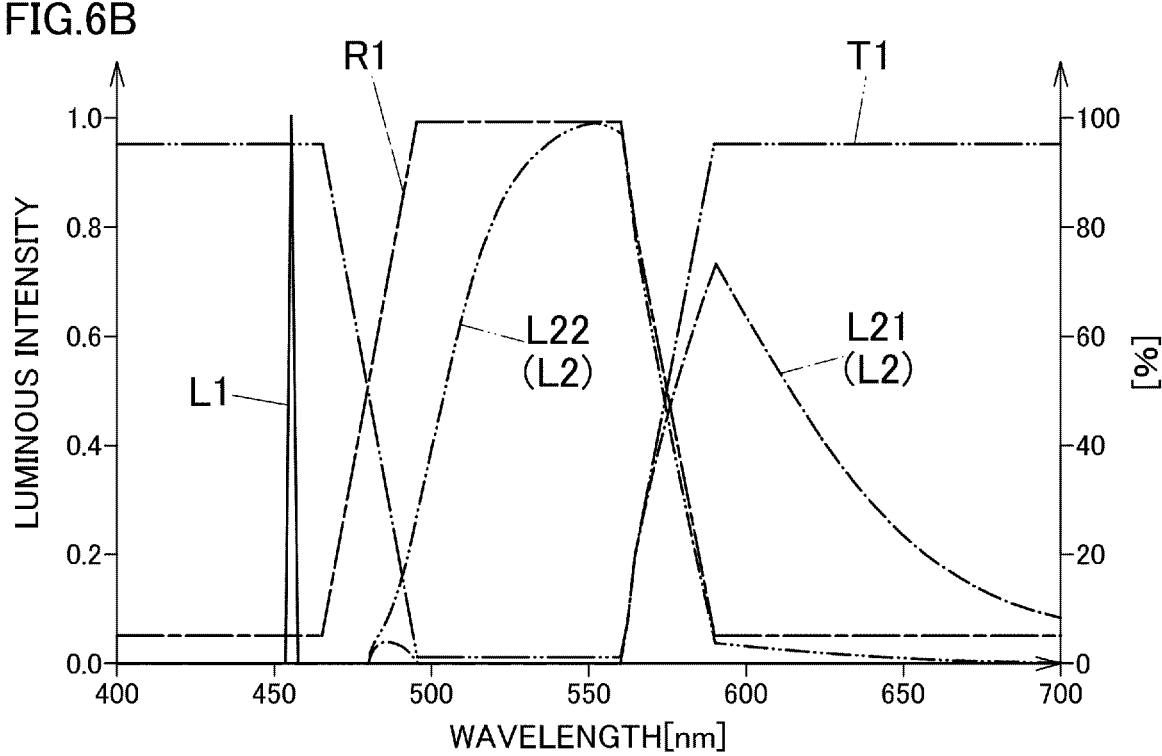
FIG. 6B is a diagram explaining actions of lights in the red phosphor area according to the embodiment of the present invention, which shows a wavelength distribution of first fluorescent light that is separated by the dichroic filter.

As shown in FIG. 4B, in the first fluorescent light L2 that is excited as a result of the excitation light L1 having been shined on the red phosphor body 321, the dichroic filter 322 can selectively transmit red fluorescent light L21 having a first wavelength component on the long wavelength side and reflect light having a second wavelength component that is located closer to the short wavelength side than the first wavelength component towards the red phosphor body 321 as secondary excitation light L22. FIG. 6B shows wavelength distributions of the red fluorescent light L21 and the secondary excitation light L22. The red fluorescent light L21 is transmitted through the dichroic filter 322 to be emitted towards the collective lens group 111 shown in FIG. 2. On the other hand, the secondary excitation light L22 that is reflected by the dichroic filter 322 (refer to FIG. 4B) is shined on to the red phosphor body 321 again to excite the red phosphor body 321.

Figure 7:
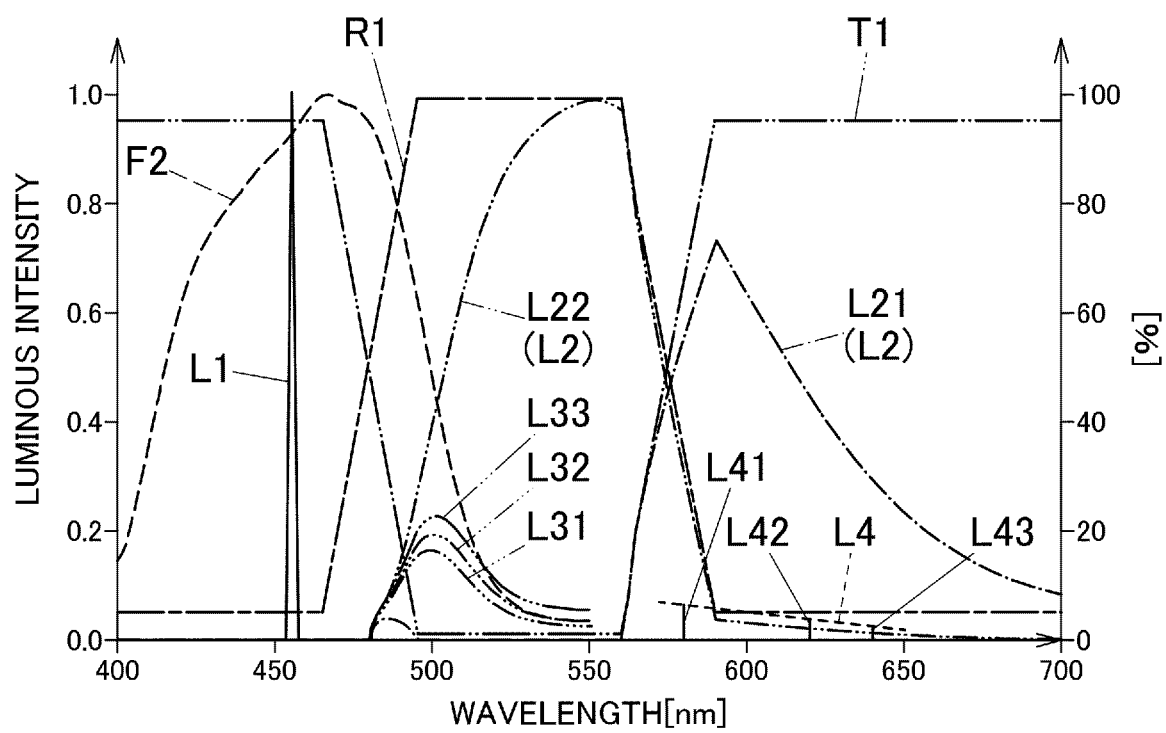
FIG. 7 is a diagram showing effective light in second excitation light and second fluorescent light in the red phosphor area according to the present embodiment.

FIG. 7 shows distributions of an excitation spectrum F2, effective lights L31 to L33, and secondary fluorescent light L4 in addition to the lights L1, L2 shown in FIG. 6B. The effective lights L31 to L33 show schematically wavelength distributions that can be reused as excitation light for the red phosphor body 321 in the secondary excitation light L22. In FIG. 7, peak intensities of the first fluorescent light L2 and the individual excitation spectra F1 to F3 are referred to as 1, and wavelength distributions of intensities obtained by multiplying the secondary excitation light L22 by the individual excitation spectra F1 to F3 are shown as the effective lights L31 to L33. In FIG. 7, the excitation spectra F1, F3 are omitted from illustration.

A light intensity in the vicinity of 499 nm, which is a peak wavelength of the effective light L31, is about 0.156. A light intensity in the vicinity of 501 nm, which is a peak wavelength of the effective light L32, is about 0.194. Additionally, a light intensity in the vicinity of 501 nm, which is a peak wavelength of the effective light L33, is about 0.215. The red phosphor body 321 emits first fluorescent light L2 in which the excitation spectra F1 to F3 (refer to FIG. 5) for fluorescent wavelengths (for example, a wavelength range of 560 nm or greater) that are included in the first wavelength component and the second wavelength component (for example, a wavelength range of about 480 nm to 580 nm) are superimposed. The red phosphor body 321 is excited by a wavelength component corresponding to the effective lights L31 to L33 in the secondary excitation light L22 to thereby emit secondary fluorescent lights L41 to L43. Here, the secondary fluorescent light L41 is fluorescent light of 580 nm that is excited by the effective light L31, the secondary fluorescent light L42 is fluorescent light of 620 nm that is excited by the effective light L32, and the secondary fluorescent light L43 is fluorescent light of 640 nm that is excited by the effective light L33. In the present embodiment, since an absolute value of the fluorescent light emission intensity decreases in the order of the excitation spectrum F1, the excitation spectrum F2 and the excitation spectrum F3 (in FIG. 5, the fluorescent light emission intensity is shown by the relative values with its maximum value being referred to as 1, and no absolute value is shown), the light intensity decreases in the order of the secondary fluorescent light L41, the secondary fluorescent light L42, and the fluorescent light L43 in FIG. 7.

In addition, in the present embodiment, although the secondary excitation lights L41 to L43 are described which correspond to the excitation spectra F1 to F3 and the effective lights L31 to L33 when the wavelengths of the fluorescent lights are 580 nm, 620 nm, and 640 nm, the secondary excitation light L22 can cause secondary fluorescent light L4 having a predetermined range width as shown by a broken line in FIG. 7 to be emitted by re-exciting the red phosphor body 321. Due to its transmission characteristic T1, the dichroic filter 322 transmits partial light (red fluorescent light L44) in the secondary fluorescent light L4 that is located on a long wavelength side of the secondary fluorescent light L4 and corresponds to a red wavelength range. Consequently, red light source light L5 can be emitted from the red phosphor area 320 in which the red fluorescent light L44, which makes up the secondary fluorescent light L4, and the red fluorescent light L21 are superimposed. In addition, in the secondary fluorescent light L4, light that is re-reflected by the dichroic filter 322 can also be reused as excitation light for exciting the red phosphor body 321.

Figure 4C:
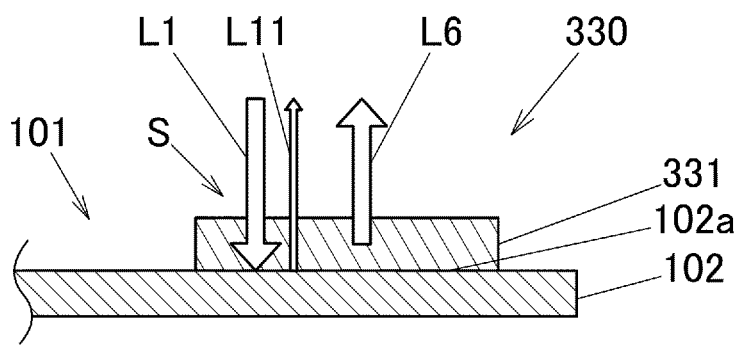
FIG. 4C is a sectional view of a green phosphor area taken along a line IVc-IVc in the schematic plan view of the phosphor wheel shown in FIG. 3 according to the embodiment of the present invention.

In the green phosphor area 330 shown in FIG. 4C, too, as with the red phosphor area 320 shown in FIG. 4B, a green phosphor body 321 is formed on the mirror surface 102a of the base 102. The green phosphor body 331 is excited by excitation light L1 to thereby emit second fluorescent light. Second fluorescent light is emitted in every direction, whereafter a part of the second fluorescent light so emitted is emitted directly towards the collective lens group 111 shown in FIG. 2 as light source light L6, while another part of the second fluorescent light is reflected on the mirror surface 102a of the base 102 to then be emitted or directed towards the collective lens group 111 as light source light L6. The light source light L6 is light in the green wavelength range.

A configuration may be provided in which as with the dichroic filter of the red phosphor body 321, a dichroic filter, which is configured to reflect a short wavelength side of second fluorescent light emitted from the green phosphor body 331, is provided on a surface of the green phosphor body 331 on to which excitation light L1 is shined so as to re-excite the green phosphor body 331 by secondary excitation light.

Returning to FIG. 2, when light in the blue wavelength range, which is excitation light L1 emitted from the excitation light shining device 70, is shined on to the red phosphor area 320 or the green phosphor area 330 of the phosphor wheel 101 in a time-sharing fashion, the phosphor wheel 101 emits light in the red wavelength range or light in the green wavelength range in a time-sharing fashion as fluorescent light. Light in the red wavelength range or light in the green wavelength range is emitted towards the back panel 13 and re-enters the collective lens group 111. On the other hand, when light in the blue wavelength range, which is excitation light, enters the transmission area 310, the light in the blue wavelength range is transmitted through or is diffuse transmitted through the phosphor wheel 101 to enter the collective lens 115, which is disposed on a back side (in other words, a side facing the front panel 12) of the phosphor wheel 101.

The light guiding optical system 140 includes collective lenses for collecting pencils of light in the red wavelength range, light in the green wavelength range, and light in the blue wavelength range, reflection mirrors for changing the directions of axes of those pencils of lights in the red, green and blue wavelength ranges, and dichroic mirrors. Specifically speaking, the light guiding optical system 140 includes a first dichroic mirror 141, a first reflection mirror 143, a second reflection mirror 145, a second dichroic mirror 148, and multiple collective lenses 146, 147, 149.

The first dichroic mirror 141 is disposed on optical paths of light in the blue wavelength range that is emitted from the excitation light shining device 70 and light in the red wavelength range and light in the green wavelength range that are emitted from the phosphor wheel 101. The first dichroic mirror 141 reflects light in the red wavelength range and light in the green wavelength range and transmits light in the blue wavelength range. Axes of light in the red wavelength range and light in the green wavelength range that are emitted from the phosphor wheel 101 are changed in direction through 90 degrees in the direction of the left panel 15.

The first reflection mirror 143 is disposed on an optical path of light in the blue wavelength range that is transmitted or diffuse transmitted through the phosphor wheel 101, that is, between the collective lens 115 and the front panel 12. The first reflection mirror 143 reflects light in the blue wavelength range to change the direction of an axis thereof through 90 degrees in the direction of the left panel 15. The second reflection mirror 145 is disposed on a side of the collective lens 146 which faces the left panel 15. The second reflection mirror 145 changes the direction of an axis of light in the blue wavelength range that is collected at the collective lens 146 through 90 degrees towards the back panel 13. The collective lens 147 is disposed on a side of the second reflection mirror 144 that faces the back panel 13.

The collective lens 149 is disposed at a side of the first dichroic mirror 141 that faces the left panel 15. Light in the red wavelength range and light in the green wavelength range that are reflected at the first dichroic mirror 141 are incident on the collective lens 149.

The second dichroic mirror 148 is disposed at a side of the collective lens 149 that faces the left panel 15 and a side of the collective lens 147 that faces the back panel 13. The second dichroic mirror 148 reflects light in the red wavelength range and light in the green wavelength range and transmits light in the blue wavelength range. As a result, light in the red wavelength range and light in the green wavelength range that are collected at the collective lens 149 are reflected by the second dichroic mirror 148 and are collected to an entrance port of the light guiding device 175 by way of a collective lens 173 in the light source-side optical system 170. On the other hand, light in the blue wavelength range that is transmitted through the collective lens 147 is transmitted through the second dichroic mirror 148 and is then collected to the entrance port of the light guiding device 175 by way of the collective lens 173.

The light source-side optical system 170 includes the collective lens 173, the light guiding device 175 such as a light tunnel, a glass rod, or the like, a collective lens 178, a light axis changing mirror 181, a collective lens 183, a shining mirror 185, and a condenser lens 195. The condenser lens 195 emits image light emitted from the display device 51, which is disposed at a side of the condenser lens 195 that faces the back panel 13, towards the projection optical system 220, and therefore, the condenser lens 195 also constitutes a part of the projection optical system 220.

The collective lens 173, which is disposed in the vicinity of the light guiding device 175, collects light source light to the entrance port of the light guiding device 175. Light in the red wavelength range, light in the green wavelength range, and light in the blue wavelength range are collected by the collective lens 173 and are then incident on the light guiding device 175. Pencils of light that are incident on the light guiding device 175 are each converted into a pencil of light whose intensity is more uniformly distributed by the light guiding device 175.

The collective lens 178 and the light axis changing mirror 181 are disposed on an optical axis of the light guiding device 175 on a side thereof that faces the back panel 13. A pencil of light that emerges from an exit port of the light guiding device 175 is collected at the collective lens 178, and thereafter, an axis of the pencil of light is changed to be directed towards the left panel 15 by the light axis changing mirror 181.

The pencil of light, which is reflected by the light axis changing mirror 181, is collected by the collective lens 183 and is then shined on to the display device 51 at a predetermined angle by way of the condenser lens 195 by the shining mirror 185. The display device 51 is cooled by a heat sink 190 that is provided on a side thereof that faces the back panel 13.

The projection optical system 220 includes the movable lens group 235, and a fixed lens group 225. A pencil of light, which is light source light shined on an image forming plane of the display device 51, is reflected on the image forming plane of the display device 51 and is then projected on to a screen by way of the projection optical system 220 as projected light. The movable lens group 235 is made to be moved by the lens motor. Then, the movable lens group 235 and the fixed lens group 225 are incorporated in a fixed lens barrel. Thus, the fixed lens barrel including the movable lens group 225 can be referred to as a variable-focus lens, which can be controlled for zooming and focusing.

With the projector 10 that is configured as has been described heretofore, when the phosphor plate 101 (a phosphor member) is rotated and light is emitted from the excitation light shining device 70 at an appropriate timing, lights in the blue, red, and green wavelength ranges are sequentially incident on the light source-side optical system 170 by way of the light guiding optical system 140 and are further incident on the display device 51. The projector 10 can project a color image on to a screen as a result of DMD, which is the display device 51, time-sharing blue, red and green lights in accordance with data.

Thus, according to the present embodiment, the utilization efficiency of excitation light L1 is enhanced in the red phosphor area 320, whereby the light intensity of light in the red wavelength range that is emitted as light source light L5 can be enhanced.

In the present embodiment, the configuration is described in which excitation light L1 is shined on to the individual areas (the transmission area 310, the red phosphor area 320 or the green phosphor area 330) of the phosphor wheel 101, which is being rotationally driven, whereby light in the blue wavelength range, light in the red wavelength range (light source light L5), and light in the green wavelength range (light source light L6) are emitted. However, the light source apparatus 60 may include a fixed phosphor plate (a phosphor member) having a red phosphor area 320 in place of the rotating phosphor wheel 101 (the phosphor member). In this case, too, the red phosphor area 320 provided on the phosphor plate can be given the same configuration as that shown in FIG. 4B, whereby the red phosphor area 320 can emit light in the red wavelength range by using excitation light L1 efficiently. In addition, the light source apparatus 60 can be configured to emit light in the green wavelength range as light source light by including a phosphor plate having a green phosphor area 330 having the same configuration as that shown in FIG. 4C.

In the present embodiment, the configuration is described in which the phosphor wheel 101 includes the transmission area 310, and light in the blue wavelength range, which is excitation light, is transmitted through the transmission area 310, whereafter the light in the blue wavelength range is guided to the guiding device 175 by the light guiding optical system 140. However, the phosphor wheel 101 may have a reflection area configured to reflect or diffuse reflect excitation light L1 in place of the transmission area 310. In this case, in FIG. 2, the first dichroic mirror 141 can be configured to transmit light in a first polarizing direction and reflect light in a second polarizing direction which is perpendicular to the first polarizing direction in the wavelength range of excitation light L1. Then, a quarter-wave plate is disposed between the first dichroic mirror 141 and the collective lens group 111, whereby excitation lights L1 in the first polarizing direction which are aligned in the same polarizing direction can be allowed to enter the collective lens group 111 from a side that faces the excitation light shining device 70. As a result, excitation light L1 passes sequentially through the first dichroic mirror 141 and the quarter-wave plate in that order, whereafter the excitation light L1 is reflected on the reflection area of the phosphor wheel 101 to pass through the quarter-wave plate twice, whereby the polarizing direction can be changed from the first polarizing direction to the second polarizing direction. Thereafter, excitation light L1 in the second polarizing direction is reflected towards the collective lens 149 by the first dichroic mirror 141. As a result, the reflection mirrors 143, 145 and the collective lens 146 can be omitted which are shown in FIG. 2 as the configuration for guiding light in the blue wavelength range.

Next, a modified example of the present embodiment will be described by reference to FIG. 8. In this modified example, the phosphor plate device 100 includes a phosphor wheel 101A (a phosphor member) in place of the phosphor wheel 101. In the description of the phosphor wheel 101A, like reference numerals will be given to like configurations to those of the phosphor wheel 101, so that the description of those like configurations will be omitted or simplified here. The phosphor wheel 101A has a red phosphor area 320A in place of the red phosphor area 320 of the phosphor wheel 101, and this red phosphor area 320A is configured to emit red fluorescent light L21 in the same direction as a direction in which excitation light L1 enters. When compared with the red phosphor area 320, the red phosphor area 320A has a different layer structure.

Figure 8:
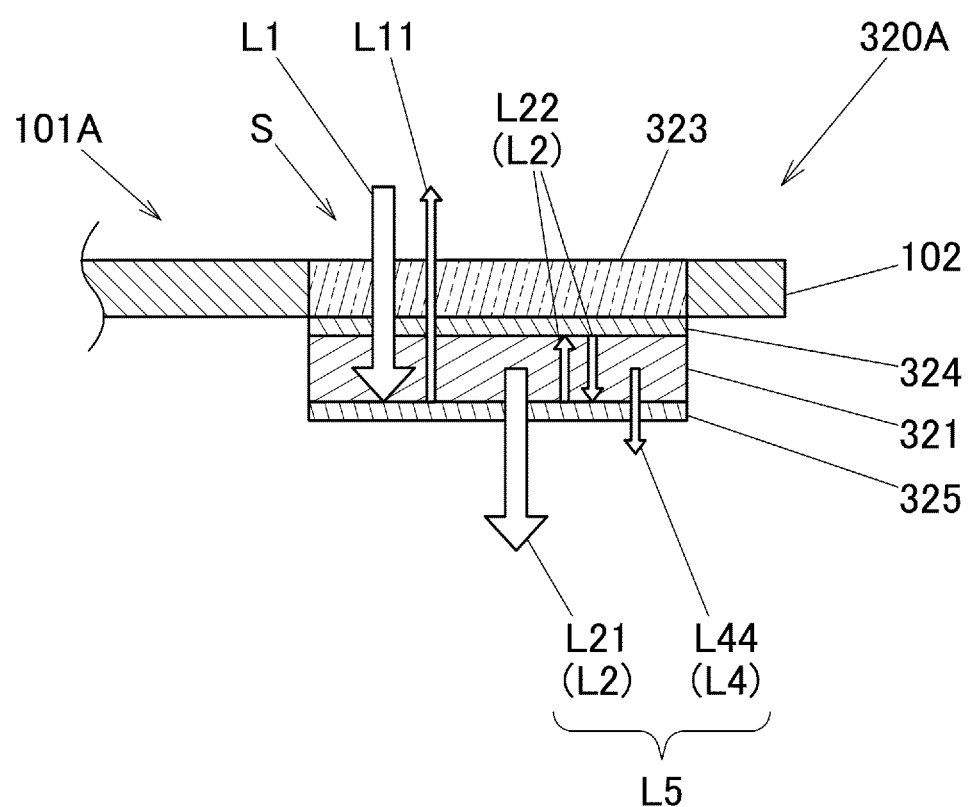
FIG. 8 is a schematic sectional view showing a configuration of a red phosphor area according to a modified example of the present invention.

In the red phosphor area 320A shown in FIG. 8, a transmission member 323, a first dichroic filter 324, a red phosphor body 321, and a second dichroic filter 325 are provided sequentially in that order as seen from an entrance side of excitation light L1. The transmission member 323 is formed in a cut-out hole portion cut in a base 102 to transmit excitation light L1. The first dichroic filter 324 transmits mainly excitation light L1, which is light in the blue wavelength range and reflects light in the green wavelength range and light in the red wavelength range. The first dichroic filter 324 has a characteristic resulting from modification of the transmission characteristic T1 and the reflection characteristic R1 shown in FIG. 6A and can hold a transmissivity of the order of 95% (a reflectance factor of the order of 5%) in a wavelength range up to 465 nm on a short wavelength side and a transmissivity of the order of 1% (a reflectance factor of the order of 99%) in a wavelength range from 495 nm onward. In addition, the second dichroic filter 325 transmits mainly light in the red wavelength range and reflects light in the blue wavelength range and light in the green wavelength range. The second dichroic filter 325 also has a characteristic resulting from modification of the transmission characteristic T1 and the reflection characteristic R1 shown in FIG. 6A and can hold a transmissivity of the order of 95% (a reflectance factor of the order of 5%) in a wavelength range from 590 nm onward on a long wavelength side and a transmissivity of the order of 1% (a reflectance factor of the order of 99%) in a wavelength range up to 560 nm.

Excitation light L1 that enters the red phosphor area 320A is transmitted through the transmission member 323 and the first dichroic filter 324 to thereby excite the red phosphor body 321. A part of the excitation light L1 is emitted towards the excitation light shining device 70 as excitation light L11 without exciting the red phosphor body 321.

Excitation spectra (including the excitation spectra F1 to F3) and first fluorescent light L2 of the red phosphor body 321 are similar to those of the red phosphor area 320 (refer to FIGS. 5 and 6A). Consequently, a wavelength component on a long wavelength side of the first fluorescent light L2 is transmitted through the second dichroic filter 325 to be emitted therefrom as red fluorescent light L21. On the other hand, a wavelength component on a short wavelength side is reflected by the first and second dichroic filters 324, 325 to re-excite the red phosphor body 321 as secondary excitation light L22. The red phosphor body 321 is excited by the secondary excitation light L22 to thereby emit secondary fluorescent light L4. A wavelength component on a long wavelength side of the secondary fluorescent light L4 is transmitted through the second dichroic filter 325 as red fluorescent light L44. Consequently, red light source light L5, in which the red fluorescent light L44, which is a part of the secondary fluorescent light L4, and the red fluorescent light L21 are superimposed, can be emitted from the red phosphor area 320A.

Thus, in the modified example, since the entrance direction of excitation light L1 and the exit direction of red light source light L5 can be set in the same direction, the configuration for enhancing the utilization efficiency of excitation light L1 can be applied to a different layout from that of the optical members such as the collective lenses, the reflection mirrors, and the like of the light source apparatus 60 shown in FIG. 2.

Thus, the present embodiment describes the phosphor member (101, 101A) having the phosphor body (321) configured to emit first fluorescent light L2 when excitation light L1 is shined thereon and the dichroic filter 322, the light source apparatus 60, and the projector 10. The dichroic filter 322 transmits the first wavelength component in the first fluorescent light L2 as light source light L5 and reflects the second wavelength component whose wavelength is shorter than that of the first wavelength component towards the phosphor body (321) as secondary excitation light L22. As a result, the utilization efficiency of excitation light L1 can be enhanced to thereby enhance the light intensity of light in the red wavelength range that is emitted as light source light.

The dichroic filter 322 is formed so as to transmit excitation light L1 whose wavelength is shorter than the second wavelength component and is disposed on one side or a first side of the phosphor body (321). In addition, the mirror surface configured to reflect excitation light L1 and first fluorescent light L2 is formed on the other side or a second side of the phosphor body (321). As a result, the utilization efficiency of excitation light L1 can be enhanced to thereby enhance the directivity of first fluorescent light L2.

The phosphor member (101) is the phosphor wheel 101 on which the red phosphor area 320, which has the phosphor body (321) and the dichroic filter 322 and on which the mirror surface 102a is formed, and the transmission area 310, which is configured to transmit excitation light L1, are provided end to end in the circumferential direction. As a result, the light source apparatus 60 can emit light source lights of different colors in a time-sharing fashion with the configuration involving a smaller number of optical members.

In addition, the green phosphor area 330, which has the green phosphor body 331 configured to emit second fluorescent light whose wavelength distribution differs from that of the first wavelength component when excitation light L1, which is light in the blue wavelength range, is shined thereon and on which the mirror surface 102a is formed, is provided end to end with the red phosphor area 320 and the transmission area 310 on the phosphor wheel 101. As a result, the light source apparatus 60 can emit red, green, and blue light source lights in a time-sharing fashion to thereby form a color image.

In addition, the phosphor body (321) emits first fluorescent light L2 in which the excitation spectra (F1 to F3) for the fluorescent wavelength included in the first wavelength component and the second wavelength component are superimposed. As a result, a wavelength component of the first fluorescent light L2 that is unnecessary for formation of red light can be reused as excitation light, thereby making it possible to enhance the utilization efficiency (fluorescent light emission or luminous efficiency).

While the embodiment of the present invention has been described heretofore, the embodiment is presented as an example, and hence, there is no intention to limit the scope of the present invention by the embodiment. The novel embodiment can be carried out in other various forms, and various omissions, replacements and modifications can be made thereto without departing from the spirit and scope of the present invention. Those resulting embodiments and their modifications are included in the scope and gist of the present invention and are also included in the scope of inventions claimed for patent under claims below and their equivalents.

What is claimed is:

1. A phosphor member comprising:
    a phosphor body configured to absorb excitation light to thereby emit first fluorescent light including a first wavelength component and a second wavelength component having a wavelength shorter than a wavelength of the first wavelength component;
    a first dichroic filter configured to transmit the excitation light, reflect the first wavelength component, and reflect the second wavelength component towards the phosphor body as second excitation light; and a second dichroic filter configured to transmit the first wavelength component as light source light and reflect the second wavelength component towards the phosphor body as second excitation light, wherein the first dichroic filter is disposed on a first side of the phosphor body, and the second dichroic filter is formed directly on a second surface of the phosphor body.

2. The phosphor member according to claim 1, further comprising:

a transmission member for transmitting the excitation light, wherein the transmission member, the first dichroic filter, the phosphor body, and the second dichroic filter are provided sequentially in that order as seen from an entrance side of the excitation light.

3. The phosphor member according to claim 2, further comprising:

a substantially circular disc-shaped base having a cut-out hole portion, wherein the transmission member is formed in the cut-out hole portion.

4. A light source apparatus comprising:

a phosphor member comprising a phosphor body configured to absorb excitation light to thereby emit first fluorescent light including a first wavelength component and a second wavelength component having a wavelength shorter than a wavelength of the first wavelength component and a first dichroic filter configured to transmit the excitation light, reflect the first wavelength component, and reflect the second wavelength component towards the phosphor body as second excitation light; and a second dichroic filter configured to transmit the first wavelength component as light source light and reflect the second wavelength component toward the phosphor body as second excitation light, wherein the first dichroic filter is disposed on a first side of the phosphor body, and the second dichroic filter is formed directly on a second surface of the phosphor body, and an excitation light source configured to emit blue light as the excitation light, wherein the second dichroic filter transmits red light which is the first wavelength component.

5. The light source apparatus according to claim 4, further comprising:

a transmission member for transmitting the excitation light, wherein the transmission member, the first dichroic filter, the phosphor body, and the second dichroic filter are provided sequentially in that order as seen from an entrance side of the excitation light.

6. The light source apparatus according to claim 5, further comprising:

a substantially circular disc-shaped base having a cut-out hole portion, wherein the transmission member is formed in the cut-out hole portion.

7. A projector comprising:

a light source apparatus including a phosphor member having a phosphor body configured to absorb excitation light to thereby emit first fluorescent light including a first wavelength component and a second wavelength component having a wavelength shorter than a wavelength of the first wavelength component, a first dichroic filter configured to transmit the excitation light, reflect the first wavelength component, and reflect the second wavelength component towards the phosphor body as second excitation light; and a second dichroic filter configured to transmit the first wavelength component as light source light and reflect the second wavelength component towards the phosphor body as second excitation light, wherein the first dichroic filter is disposed on a first side of the phosphor body, and the second dichroic filter is formed directly on a second surface of the phosphor body and an excitation light source configured to emit blue light as the excitation light;

a display device configured to form image light when light source light from the light source apparatus is shined on thereto;

a projection optical system configured to project the image light formed by the display device; and a processor configured to control the display device and the light source apparatus.

8. The projector according to claim 7, wherein the display device is a digital micromirror device.

* * * * *